United States Patent Office 3,419,082
Patented Dec. 31, 1968

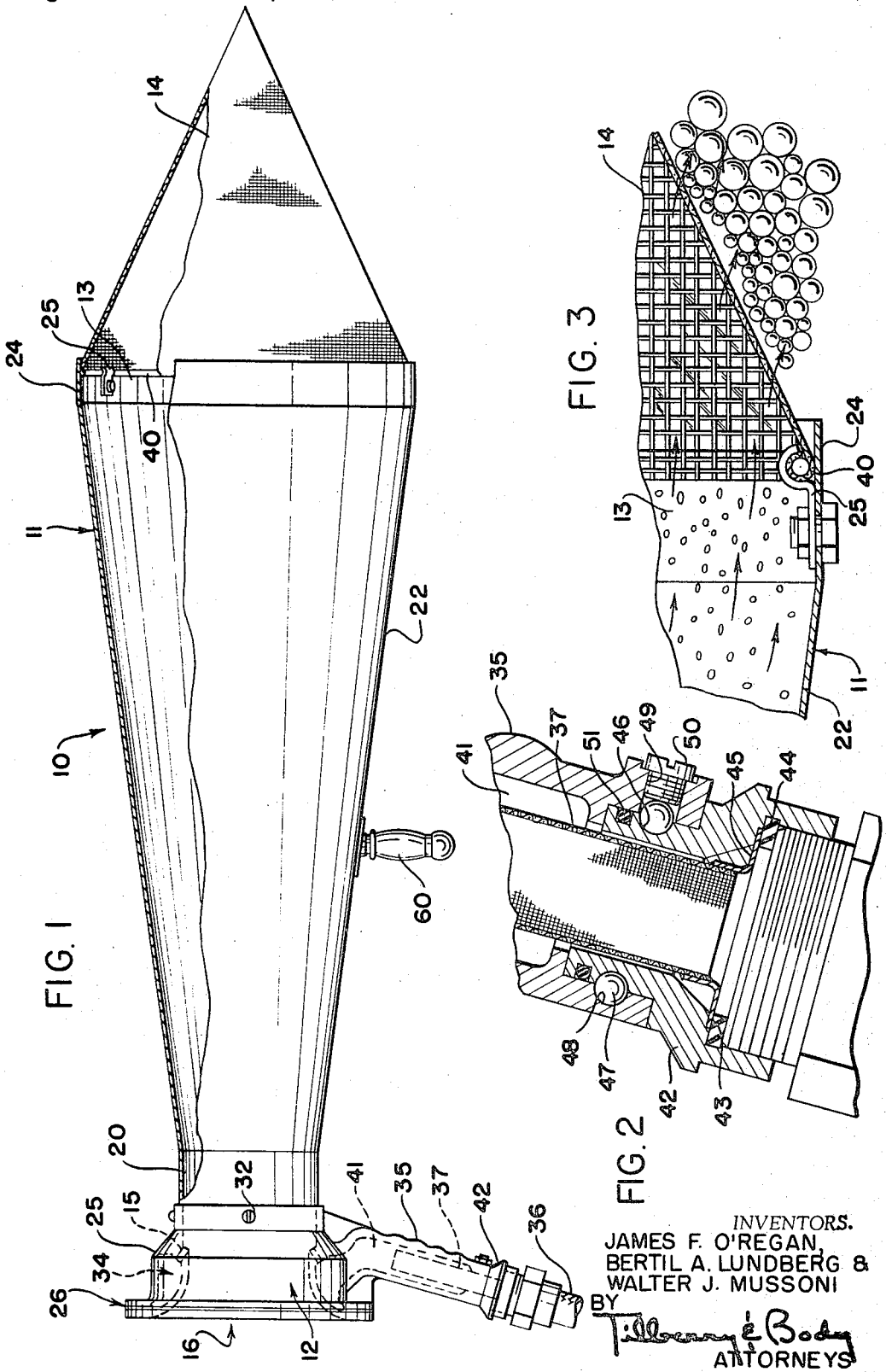

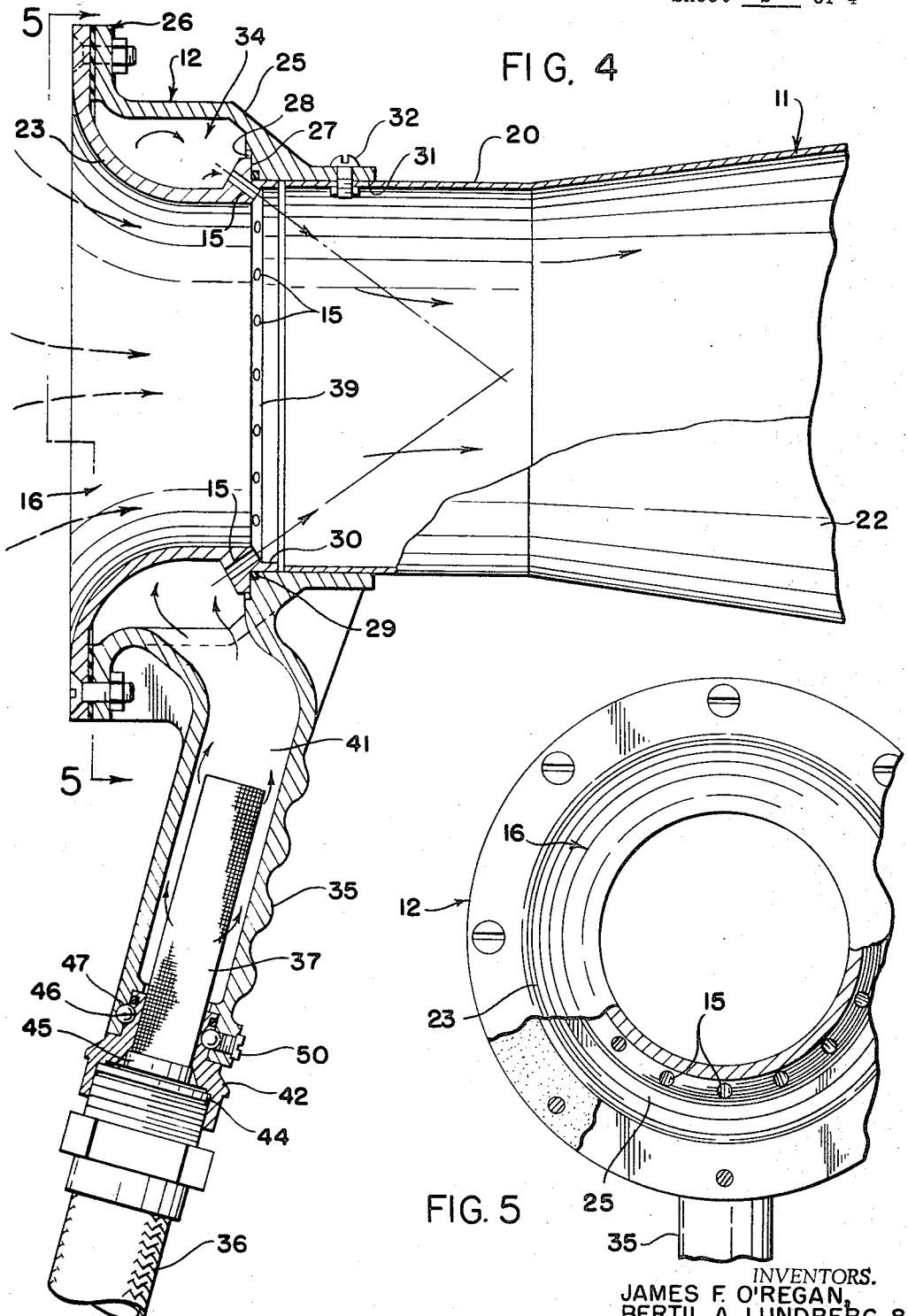

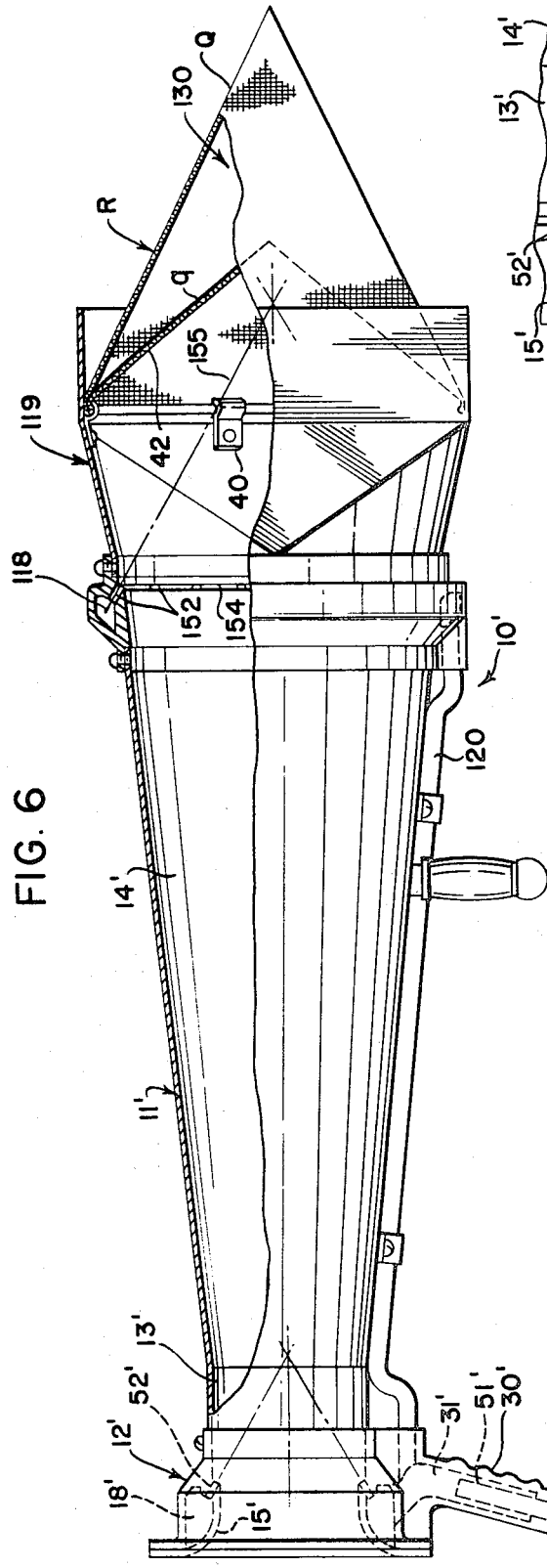
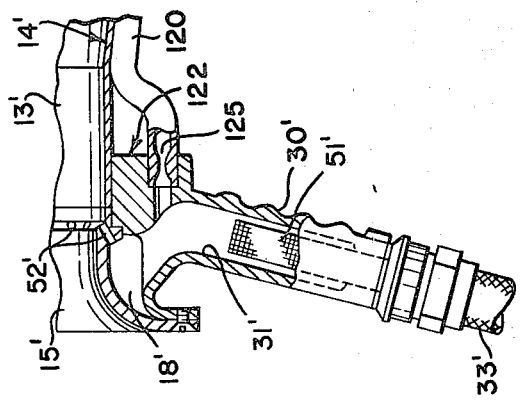
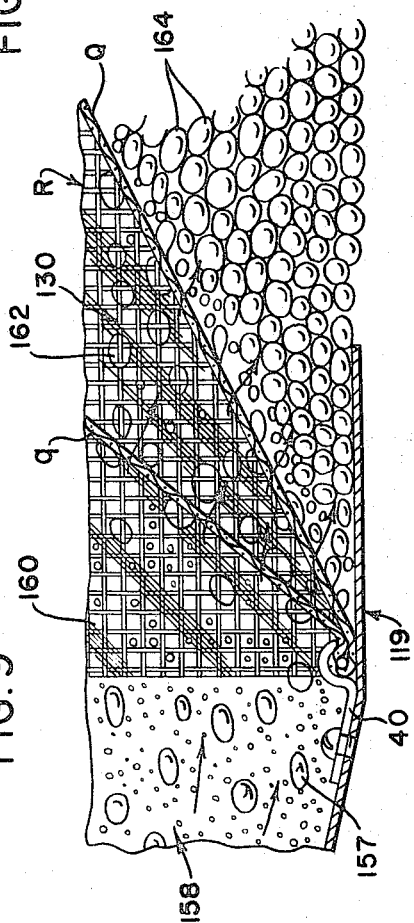

3,419,082
PORTABLE FOAM NOZZLE
James Francis O'Regan, Bertil Anders Lundberg, and Walter John Mussoni, Worcester, Mass., assignors to E. W. Bliss Company, Canton, Ohio, a corporation of Delaware
Continuation of application Ser. No. 560,985, June 27, 1966, which is a continuation of application Ser. No. 443,761, Mar. 12, 1965, which is a continuation-in-part of application Ser. No. 358,771, Apr. 10, 1964. This application Mar. 16, 1967, Ser. No. 623,779
3 Claims. (Cl. 169—15)

ABSTRACT OF THE DISCLOSURE

The disclosure pertains to a fire protection nozzle for generating high expansion foam in which an elongated tubular barrel has a long, diverging, longitudinal section and a shorter throat section of restricted diameter adjacent one end. An annular array of jets in the restricted throat section are directed into the tubular barrel in such a fashion as to induce a flow of air therethrough. A mesh or sieve across the opposite end of the tubular barrel has openings therein of a size capable of being filmed over by the foam solution and foam is generated as the air escapes through the openings.

---

This is a continuation of Ser. No. 560,985 filed June 27, 1966, now abandoned, which is a continuation of Ser. No. 443,761 filed Mar. 12, 1965, now abandoned, which in turn is a continuation-in-part of Ser. No. 358,771, filed Apr. 10, 1964, also now abandoned.

Known high expansion foam generators are usually fixed installations which employ electrically powered fans to develop the volume and velocity of air required for ultra-high-expansion foam. Even if relatively portable, such generators are heavy and cumbersome which limits their deployment at the fire site. Their use is contingent upon the ability to move them to the most effective vantage point and upon the availability of the required electrical power to operate the fan motor. Obviously electrical lines are a hazard in the presence of water which always exists around a fire site.

It is the purpose of this invention to overcome these disadvantages and others and to provide a fully portable foam generator which can be easily carried by one man and which is capable of producing ultra-high-expansion foam without the use of blowers or fans.

In accordance with the broadest aspect of the invention ultra-high-expansion foam is produced by forcing large volumes of air through a liquid saturated pervious member by means of a foam generator powered solely by water pressure.

Further in accordance with the invention, the foam generator comprises a tubular barrel of increasing cross sectional area having aligned inlet and outlet openings and a water jet pumping means connected to a source of water pressure acting within the barrel to induce a flow of air therethrough, the pervious member extending across the barrel adjacent the outlet opening and being continuously saturated by the airborne spray.

Further in accordance with the invention, the water jet pumping means comprises an annular manifold surrounding the barrel adjacent the inlet opening and an annular array of circumferentially spaced spray jets opening from the manifold into the barrel to direct a cone of spray toward the pervious member.

Where the water pressure exceeds a predetermined value the spray may be blown through the pervious member without thoroughly wetting it, thus in accordance with another aspect of the invention, secondary spray jets operating at a lower pressure discharge into the barrel between the pervious member and first spray jets so as to insure complete saturation of the pervious member.

Further in accordance with this aspect of the invention and to additionally insure that the finely atomized spray or mist is not exhausted without generating foam, the pervious member comprises prefoam and primary foam generating interstices, the prefoam interstices being axially spaced from the primary foam interstices toward the inlet opening of the barrel and being effective to cause full saturation of the primary interstices at the higher operating pressure.

The principal object of the invention is to provide a portable ultra-high-expansion foam generator which is of simple nozzle-like construction, can be easily carried about by one man and is powered by water pressure supplied by a single hose line.

Another object of the invention is to provide a foam generator in which large volumes of air are forced through a tubular barrel of increasing cross sectional area, by means of the pumping action of a water jet connected to the water pressure source.

Another object of the invention is to produce ultra-high-expansion foam by forcing air through a pervious member continuously saturated with a liquid foaming agent whereby the escaping air is trapped in bubble formations of foam.

Another object is to provide a nozzle-like foam generator which will operate with equal efficiency at both low and high operating pressures.

These and other objects and features of the invention will become apparent from the following detailed description taken in connection with the accompanying drawings which form a part of this specification and in which:

FIGURE 1 is a side view of the invention showing a portion of the generator nozzle broken away;

FIGURE 2 is a sectional view of the rear hand grip showing the hose connection for the generator nozzle of FIGURE 1;

FIGURE 3 is an enlarged view of a portion of the generator nozzle depicting the mechanism of foam formation;

FIGURE 4 is a sectional view at the air intake end of the generator nozzle shown in FIGURE 1;

FIGURE 5 is a rear end view partially broken away to show the spray jets taken approximately along line 5—5 of FIGURE 4;

FIGURE 6 is a side view similar to FIGURE 1 of a modification of the invention;

FIGURE 8 is a partial sectional view of the modified hand grip used with the generator nozzle shown in FIGURE 6;

FIGURE 9 is an enlarged view similar to FIGURE 3 depicting the mechanism of foam formation in the modification shown in FIGURE 6;

Figure 7:
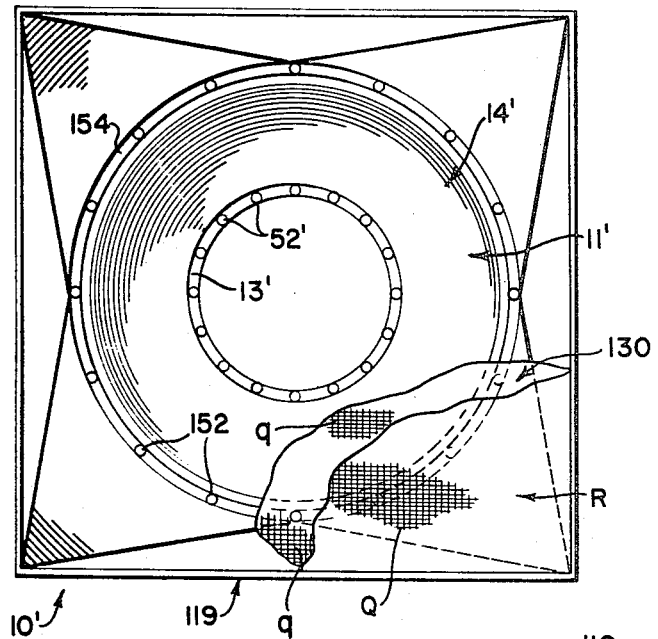
FIGURE 7 is a front end view of the generator nozzle shown in FIGURE 6 with portions of the pervious member broken away to show the high and low pressure spray jets.

Referring now to the drawings which show the preferred embodiments of the invention only and are not for the purpose of limiting same, in FIGURE 1, a machine-gun-type, hand-line, portable generator nozzle 10 is shown. The nozzle 10 is designed for easy handling and balance and can be carried by an operator as close to the source of fire as safety will permit.

In more detail, the nozzle 10 has no moving parts and basically includes a bell-shaped, tubular barrel 11, an air horn 12 and a foam generating pervious member S which may be a net-like structure more fully described hereininafter. The barrel 11 is divided into two main longitudinal sections, a restricted throat section 13 and a bell-shaped section 14. The air horn 12 is secured to the throat section 14 and includes an outwardly flared inner wall 15 and an outer wall 16 defining a manifold 18, as best shown in FIGURE 4. The inner wall 15 defines the air intake 20 of the nozzle 10 and is sealed at one end with the outer wall 16 by a gasket and flange connection 22 and at the other end by an abutment 24, shoulder 25 and O-ring 26. The air horn 12 is fitted over the throat section 13 and is held in place by a plurality of fasteners 28. A rear hand grip 30 is designed to fit the operator's hand and is formed as an integral part of the air horn 12. The manifold 18 connects through internal passage 31 with a source of pressurized foam solution supplied by a hose 33. The liquid foam solution is primarily water with the addition of a detergent foam producing chemical of any well known type. As shown in FIGURE 2, a thimble 34 at the bottom of the hand grip 30 provides a threaded connection for the hose 33 and includes a shoulder 36 which sealingly engages the end of the hose fitting by means of a washer 38. An annular groove 40 in the thimble 34 and a complementary groove 42 in the grip 30 define a ball race 43 for a plurality of ball bearings 47 to provide a swivel connection between the grip 30 and the hose 33 which is sealed by an O-ring 48. An opening 49 is closed by a plug 50 and affords an access to the ball race 43. A filter 51 prevents entrained solid particles above a given size from entering the manifold 18.

In accordance with the invention, an annular array of circumferentially spaced jets 52 open from the manifold 18 into the throat section 13 through a frustoconical surface 54 as shown in FIGURE 4. The jets 52 and the air horn 12 provides a jet pump effect in the form of a cone of spray at the axis of the barrel 11. The resultant pumping action sucks large volumes of air into the air intake 20 forcing it longitudinally down the bell-shaped section 14. The air stream continuously diminishes in velocity as it proceeds toward the net-like member S due to the increasing cross sectional area of the section 14, which is an important feature of the invention as will be explained hereinafter.

Referring to FIGURE 3, the pervious body S is preferably a net having an interwoven construction however other structures having discreet openings of a given size may be used. The net S fully covers the exhaust opening of the barrel 11 and is formed in the shape of a cone having a peripheral bead 55 engaged by clips 56 used to hold the net in place. Any suitable material may be used for the net S such as interwoven vinyl strands or the like forming a fabric which can be folded inside the barrel 11 when not in use. The mesh size of the interwoven fabric should be fairly open but can range between a minimum and maximum opening size without seriously restricting air flow or affecting foam production. An opening size range in the order of 30 to 50 openings per square inch has been found to work well.

In operation, the spray jets 52 atomize the foam solution forming the jet pumping spray cone 55 within the throat section 13 of the barrel 11 and producing a mist 58 of foam producing liquid. At pressures in the order of 40 to 100 p.s.i. sufficient pumping action is produced to induct the required volume of air for the production of ultra-high-expansion foam. Beyond the throat section 13 the barrel increases in diameter which has the effect of slowing down the mist 58 which is being borne along by the air stream. The increase in diameter is such that by time the airborne mist 58 reaches the exhaust end of the barrel 11 it is moving in a relatively quiet fashion when it comes into contact with the net S. The mist 58 saturates the net S uniformly with a liquid film 60 due primarily to the natural surface tension of the lquid. Ultra-high-expansion foam 62 is formed as the air escapes through the net openings. The foam 62 is generated when the air escapes for in doing so it becomes trapped in the bubble formations which grow out of the liquid film 60. The bell-shaped section 14 is important in insuring that there is no appreciable turbulence or high velocity to cause blown out sections in the net S. That is, if the air velocity is too great the net will not be completely saturated and air will escape without generating foam. When the nozzle is operating, the set S is pushed out to the limit of its dimension as shown in FIGURE 1 providing maximum surface area through which air must pass. At approximately 100 p.s.i. the air inducted into the foam reaction may be in the order of 1000 cubic feet per minute while in contrast conventional turbulent aeration nozzles draw air at a rate of only approximately 27 cubic feet per minute. Depending on the pressure and the size of the nozzle, the foam plug 62 is prejected at a considerable range permitting the operator to stand safely back from the source of the fire. For example, a nozzle having a diameter at the throat section of approximately 6 inches and a diameter at the exhaust end in the order of 16 inches and having a length (without the net S) of approximately 43 inches, will throw the foam plug 62 a distance of approximately 10 to 15 feet from the end of the nozzle at 100 p.s.i. These dimensions of course are only for the purpose of illustration and are not to be regarded as critical parameters of the invention. As a general rule, however, the smallest diameter of the barrel 11 is about one-third as large as the diameter at the exhaust opening for most efficient foam generation. For example, foam expansions of 100 to 1000 times the unit volume of liquid present are obtainable with the invention, whereas in the prior art turbulent aspirating nozzle expansions of only about 12 times liquid volume could be expected.

Referring now to FIGURES 6, 7 and 8, a modification of the invention is shown which is particularly suited for applications where the jet pumping action is vigorous such as when the water pressure is substantially in excess of 100 p.s.i. For purposes of description, like parts will be identified with like numerals with the addition of prime mark. The nozzle 10′, like the nozzle 10, is powered solely by water pressure, has no moving parts, electrical connections, fans, blowers or the like. The nozzle 10′ basically includes an assembly of a barrel 11′, an air horn 12′, a manifold 118, a hood 119 and a foam generating pervious member or net structure R. The air horn 12′ is constructed in a manner similar to the air horn 12 of nozzle 10 and includes a manifold 18′ connected to a hose line 33′ through a passageway 31′ in the rear hand girp 30′. An annular array of spray jets 52′ open from the manifold 18′ into the throat section 13′ of the barrel 11′.

In accordance with this aspect of invention, manifold 118 surrounds the forward end of the bell-shaped section 14′ and includes a plurality of circumferentially spaced spray jets 152 which open from the manifold 118 at a frustoconical surface 154 to from a secondary jet pumping action with a cone of spray 155 directed into the hood 119. The manifold 118 connects with the passage 31′ in the rear hand grip 30′ by means of a conduit 120. As seen in FIGURE 8, the neck of the grip 30′ is modified to provide a connection 122 for the conduit 120 which has a flow restriction 125 therein. Consequently, the manifold 18′ and spray jets 52′ operate at higher pressure than the downstream manifold 118 and spray jets 152. This pressure differential is an important aspect of the invention and may occur merely by virtue of the pressure drop through the conduit 120 without the need for restriction 125, however, the restriction 125 insures that a proper pressure differential exists between the two manifolds 18' and 118.

Further in accordance with this aspect of the invention, the foam generating member R is preferably formed with an inner net $q$ and an outer net Q, the two nets being separated by a space 130. The inner net $q$ provides a prefoam generating surface while the outer net Q functions as the primary foam generating surface. To illustrate, reference is made to FIGURE 9 showing a spray mixture comprising large droplets 157 and mist 158. The mist 158 is produced by the high pressure jets 52' and is borne along by the air stream. The velocity of the air stream is considerably greater than was the case with nozzle 10 due to the higher operating pressure which may, for example, be in the order of 150 to 300 p.s.i. Also, the jets 52' atomize the spray to a greater extent and the combined effect is to tend to blow the fine mist 158 through the net R without uniformly wetting it. This is prevented, however, in the high pressure nozzle 10'. When the mist 158 enters the hood 119 it is joined by the coarser spray 157 from the low pressure jets 152. Inasmuch as spray 157 is initially moving at low velocity it is carried by the air stream along with the mist 158 and will saturate the net $q$ with a film 160 to prevent the mist 158 from escaping. At certain operating pressures a net S such as that used with nozzle 10 may be employed with satisfactory results where the high and low pressure jets 52' and 152 are used, however, for maximum efficiency, the dual net R is preferred as will be explained.

In operation at extremely high pressures, the prefoam generating surface provided by net $q$ may not become fully saturated even with the low pressure jets 152. Nevertheless the net $q$ becomes partially saturated so that some preliminary foam 162 will be formed in the space 130 between the two nets. This preliminary foam 162 is effective at these extreme pressures to insure that the primary foam generating surface provided by net Q is completely saturated so that the maximum quantity of ultra-high-expansion foam 164 is generated.

Figure 10:
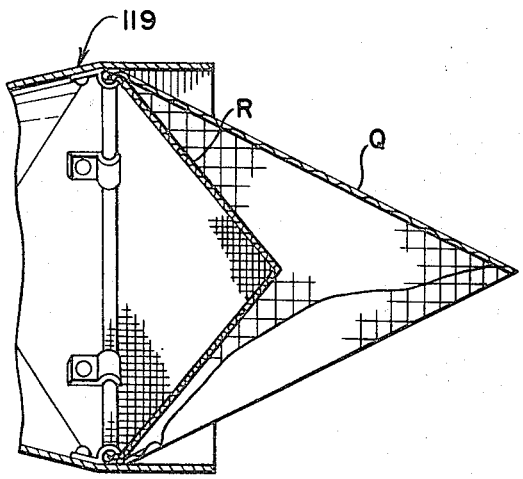
FIGURE 10 is a modification of the foam generating pervious member of FIGURE 9 in which the prefoam and primary foam generating interstices are of a different size.

Referring now to FIGURE 10, a modified version of the dual net R is shown wherein in the prefoam generating surface is provided by a net $p$ having smaller openings than a primary foam generating net P. For example, the net P may be considerably coarser than the nets S and R and have fewer openings per square inch, while the net $p$ may be considerably finer than the nets S and R and have considerably in excess of 50 openings per square inch. With this arrangement, more efficient foam generation may be achieved at extremely high pressures.

Figure 11:
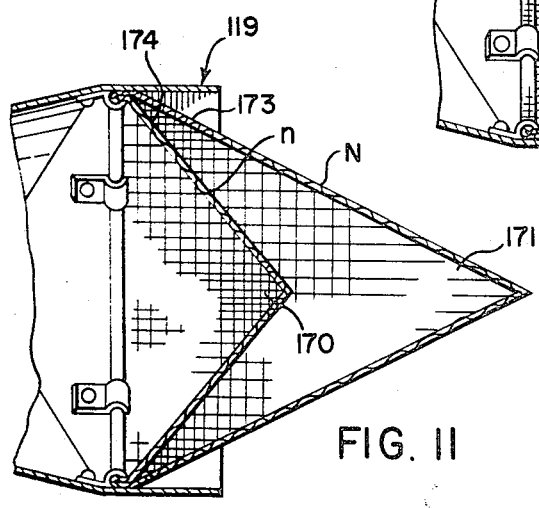
FIGURE 11 is a further modification similar to the modification shown in FIGURE 10 except the prefoam and primary foam generating interstices are of a varying, mutually complementary size.

A further modification is shown in FIGURE 11 where a prefoam generating net $n$ and a primary foam generating net N each have a varying mesh size which mutually complements the mesh size of the other. For example, the inner net $n$ may have a fine mesh size at the apex 170 while the outer net N is coarser at the apex 171 and conversely, the outer net N may be finer toward the edge 173 while the inner net $n$ becomes coarser toward the edge 174. Such an arrangement may be particularly desirable to insure maximum foam generation depending upon the velocity flow pattern of the air stream.

Figure 12:
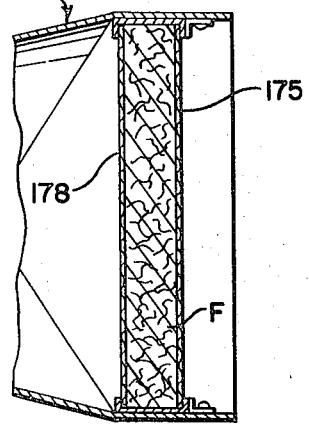
FIGURE 12 is another modification of the pervious member in the form of a filter employing filaments spun between axially spaced grids.

A further modification is shown in FIGURE 12 where instead of an interwoven fabric net as the foam generating member, a filter medium F is employed which may be formed of spun vinyl filaments retained between open grid members 175, 178. The filter F should have a minimum resistance to air flow and be of sufficient axial depth to insure complete saturation.

Having now described the invention in detail it will be apparent to persons skilled in the art that certain obvious modifications can be made without deviating from the spirit of the invention as defined in the appended claims.

We claim:

1. A fire protection nozzle for generating high expansion foam comprising
an elongated tubular barrel having a long, diverging, longitudinal section and a shorter throat section of restricted diameter adjacent one end, the diameter of the throat section being about one-third as large as the maximum diameter of said longitudinal section,
jet pump means including an annular array of converging jet orifices opening into the restricted throat section connectable to a foam producing solution under pressure to form a converging spray cone of pumping fluid,
an air inlet into the tubular barrel upstream of the jet pump means and
sieve means providing a closure across the tubular barrel adjacent the opposite end having discrete openings therein of a size in the order of 30 to 50 openings per square inch capable of supporting a substantially uniform film formed by the continuous deposition of airborne spray of pumping fluid, said jet pump means, considering the relative diameters of said restricted throat section and diverging longitudinal section of said tubular barrel, developing a high velocity airstream in the throat section, a majority of which is recovered as a pressure head in said longitudinal section whereby high expansion foam having an air-to-liquid ratio in excess of 100 to 1 is generated on said sieve means at the prevailing pressure head immediately upstream thereof; said sieve means having both an upstream and downstream portion, each containing openings of sufficient size to support said film of pumping fluid whereby foam is generated on both the upstream and downstream portions, and
with the openings in said upstream portion of the sieve means being of a smaller size than the openings in said downstream portion.

2. A fire protection nozzle for generating high expansion foam comprising
an elongated tubular barrel having a long, diverging, longitudinal section and a shorter throat section of restricted diameter adjacent one end, the diameter of the throat section being about one-third as large as the maximum diameter of said longitudinal section,
jet pump means including an annular array of converging jet orifices opening into the restricted throat section connectable to a foam producing solution under pressure to form a converging spray cone of pumping fluid,
an air inlet into the tubular barrel upstream of the jet pump means and
sieve means providing a closure across the tubular barrel adjacent the opposite end having discrete openings therein of a size in the order of 30 to 50 openings per square inch capable of supporting a substantially uniform film formed by the continuous deposition of airborne spray of pumping fluid, said jet pump means, considering the relative diameters of said restricted throat section and diverging longitudinal section of said tubular barrel, developing a high velocity airstream in the throat section, a majority of which is recovered as a pressure head in said longitudinal section whereby high expansion foam having an air-to-liquid ratio in excess of 100 to 1 is generated on said sieve means at the prevailing pressure head immediately upstream thereof; said sieve means having both an upstream and downstream portion, each containing openings of sufficient size to support said film of pumping fluid whereby foam is generated on both the upstream and downstream portions, and
wherein said openings in the upstream portion of the sieve means vary in size relative to a pattern with the openings in said downstream portion which vary in size relative to a complementary pattern.

3. A fire protection nozzle for generating high expansion foam comprising
an elongated tubular barrel having a long, diverging, longitudinal section and a shorter throat section of restricted diameter adjacent one end, the diameter of the throat section being about one-third as large as the maximum diameter of said longitudinal section, jet pump means including an annular array of converging jet orifices opening into the restricted throat section connectable to a foam producing solution under pressure to form a converging spray cone of pumping fluid, an air inlet into the tubular barrel upstream of the jet pump means and sieve means providing a closure across the tubular barrel adjacent the opposite end having discrete openings therein of a size in the order of 30 to 50 openings per square inch capable of supporting a substantially uniform film formed by the continuous deposition of airborne spray of pumping fluid, said jet pump means, considering the relative diameters of said restricted throat section and diverging longitudinal section of said tubular barrel, developing a high velocity airstream in the throat section, a majority of which is recovered as a presure head in said longitudinal section whereby high expansion foam having an air-to-liquid ratio in excess of 100 to 1 is generated on said sieve means at the prevailing presure head immediately upstream thereof; said nozzle further including a second jet pump means connectable to said fluid source downstream of said other jet pump means, the jet pumping action of said second jet pumping means being at lower pressure to provide a coarser spray of said pumping fluid to assist in the formation of a continuous film of pumping fluid on said sieve means.

References Cited

UNITED STATES PATENTS

| | | | |
|---|---|---|---|
| 2,680,010 | 6/1954 | Dubay | 239—343 |
| 2,887,275 | 5/1959 | Dixon et al. | 239—590.3 |
| 3,186,490 | 6/1965 | Jamison et al. | 169—15 |

FOREIGN PATENTS

| | | |
|---|---|---|
| 30,771 | 7/1960 | Finland. |
| 1,037,952 | 5/1953 | France. |
| 858,799 | 12/1952 | Germany. |
| 860,144 | 12/1952 | Germany. |
| 292,951 | 8/1953 | Switzerland. |

OTHER REFERENCES

Safety in Mines Research Establishment; Materials and Equipment For The Foam-Plug Method of Mine Fire Fighting, by E. T. Linacre et al., pp. 27, 28, 29.

EVERETT W. KIRBY, *Primary Examiner*.

U.S. Cl. X.R.

239—504, 553.3, 590.3, 433